United States Patent [19]

McKinstry

[11] 4,068,116
[45] Jan. 10, 1978

[54] THERMOSTATICALLY PROTECTED ELECTRIC IMMERSION WATER HEATER

[75] Inventor: James E. McKinstry, Cedar Rapids, Iowa

[73] Assignee: Nelson Manufacturing Company, Cedar Rapids, Iowa

[21] Appl. No.: 639,180

[22] Filed: Dec. 9, 1975

[51] Int. Cl.$^2$ .................... H05B 1/02; H05B 3/80; A01K 7/00
[52] U.S. Cl. .................... 219/523; 119/73; 219/318; 219/331; 219/337; 219/517; 219/533; 219/534
[58] Field of Search .............. 219/306, 316, 328, 331, 219/318, 335, 336, 337, 523, 517, 533, 534, 536, 542; 119/73

[56] References Cited

U.S. PATENT DOCUMENTS

| | | | |
|---|---|---|---|
| 887,923 | 5/1908 | Crandall | 219/523 |
| 2,412,737 | 12/1946 | Kercher | 219/328 X |
| 2,576,688 | 11/1951 | Landgraf | 219/318 |
| 2,888,547 | 5/1959 | Saper | 219/523 |
| 2,977,454 | 3/1961 | Volker | 219/331 |
| 3,280,307 | 10/1966 | Ramey et al. | 219/523 X |

FOREIGN PATENT DOCUMENTS

| | | | |
|---|---|---|---|
| 508,810 | 3/1939 | United Kingdom | 219/328 |
| 1,145,994 | 3/1969 | United Kingdom | 219/331 |

*Primary Examiner*—A. Bartis
*Attorney, Agent, or Firm*—Hill, Gross, Simpson, Van Santen, Steadman, Chiara & Simpson

[57] ABSTRACT

An immersion water heater particularly suitable for use in connection with animal watering buckets includes a housing fixed to an end of an electrical conduit and locatable on the bottom of a watering bucket. A U-shaped metallic sheathed heating element projects from the housing into a protective shield comprising plates secured to opposite sides of the heating element by spool-shaped insulator posts received between the legs of the heating element. A temperature sensing member is attached has one end attached to the heating element exteriorly of the housing and a second end extending into the housing. A thermostat and a thermofuse are located in the housing in heat exchange engagement with the second end of the temperature sensing member, whereby in the absence of water around the heating element and temperature sensing member, heat is rapidly transmitted from the heating element through the member to the thermostat and thermofuse to deenergize the heating element.

1 Claim, 4 Drawing Figures

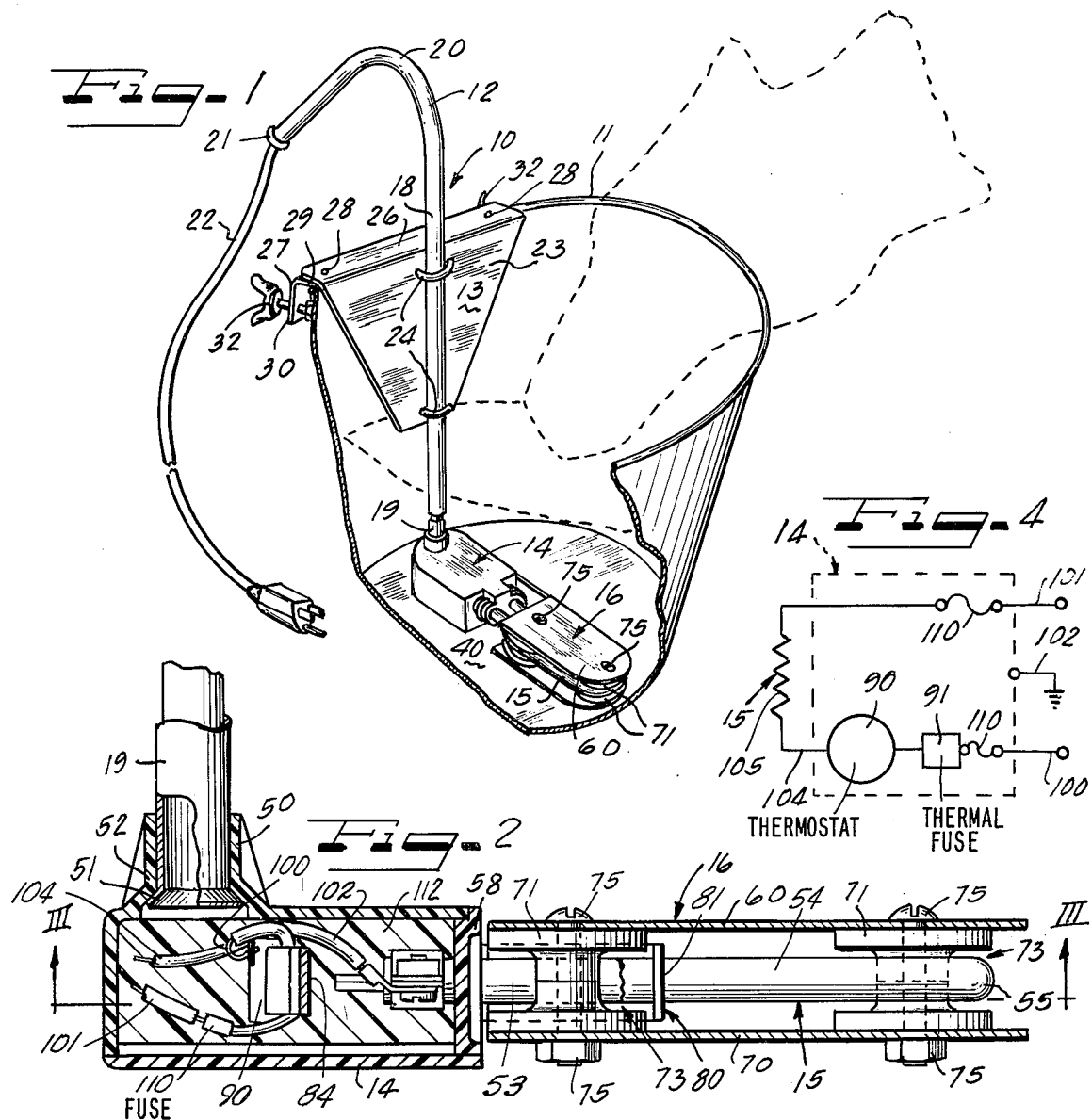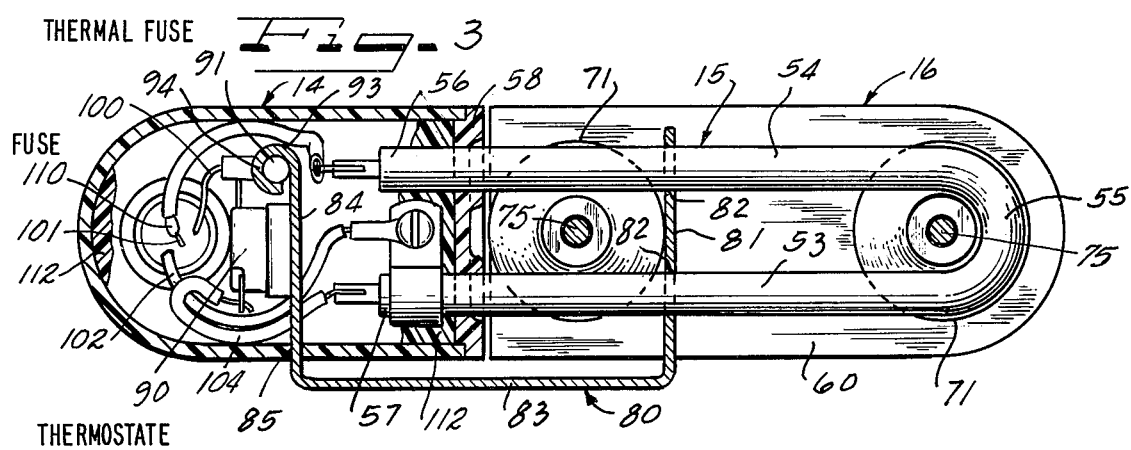

THERMOSTATICALLY PROTECTED ELECTRIC IMMERSION WATER HEATER

BACKGROUND OF THE INVENTION

1. Field of the Invention

This invention relates to heating devices and more particularly to an immersible water heater.

2. Prior Art

The provision of means to insure that non-protected small bodies of standing water do not freeze in colder climates constitutes a recognized problem. One specific example of such small water bodies includes the group of animal feeding devices. Where animals are kept outdoors or in unheated enclosures, it is necessary that they be provided with drinking water. It is also therefore necessary to insure that the drinking water will not freeze.

This problem is most prominent in small quantity feeding sources, such as for example, water buckets. Where such buckets, small troughs, and the like are provided, it is extremely important that the means provided to prevent freezing to be relatively inexpensive and foolproof. Although immersion type heaters have been known for a long time, and are readily available at satisfactory prices, they have two major drawbacks. First, when immersed in the water, the coil becomes quite hot and can damage the animal's tongue. Protection must be provided against this occurring. Secondly, unless some automatic shutoff device is provided, such immersion coils can overheat the water and, in the absence of water, either due to tilting of the bucket or exhaustion of the water through evaporation or drinking, the coil can do significant damage to the bucket, including to metal buckets or troughs and surrounding areas.

Although it has been known to use thermostats in connection with immersion heaters, where the thermostat is designed to sense the temperature of the immersion heater, shutoff can occur at a point where the upper reaches of a body of water can still freeze. Attempting to overcome this by allowing a higher setting of the thermostat can result in damage to the bucket and in overheating of small bodies of water. Thermostats which attempt to sense the temperature of the water have a distinct disadvantage in that they will not turn off the immersion heater when the bucket is empty and the atmosphere is colder than the shutoff point. This again can lead to damage of the bucket.

It would therefore be an advance in the art to provide an inexpensive immersion type water heater which overcomes the disadvantages enumerated above.

SUMMARY OF THE INVENTION

My invention provides an immersion type water heater suitable for use in maintaining the water of a watering bucket or the like at greater than freezing temperatures without the possibility of damaging either the water container, the heater unit itself, or the tongue of an animal drinking from the water container.

In addition, my invention provides a unit and simplified method of attaching the heater to a container such as a bucket at varying depths so that the heater may rest at the bottom of the bucket irrespective of the bucket height.

In the preferred embodiment illustrated, the immersion heater consists of a housing disposed at the end of a conduit, the housing including electrical connections to an immersion heating coil which projects from an end of the housing and heating control and safety components. The immersion coil projects from the housing in a loop, which for purposes of simplicity is described as being U-shaped. A guard mechanism is received around the loop to protect the animal's tongue and to prevent damage from occurring to the loop. A temperature sensing member is attached to the loop exterior of the housing and passes through the atmosphere adjacent the loop to the interior of the housing. A thermostat engages the temperature sensing member interior of the housing to control activation of the heating loop. A thermofuse also engages the temperature sensing member interior of the housing to provide a fail-safe. Additional microfuses are also provided to protect against overload.

The conduit is slidably attached to a bracket member. The bracket member has an end which is adapted to overlie the edge of a bucket. Set screws are pivotably attached to the bracket member for engaging the exterior of the bucket, the pivotable attachment allowing accomodation to the curve of the wall of the bucket or other container. In order to allow the heater to lie flat on the bottom of a diverging wall bucket, the conduit is preferably formed of relatively soft pliable material such as aluminum which can be bent adjacent the juncture of the conduit and housing.

It is therefore an object of this invention to provide an improved immersion type water heater which is easily attachable to water containers such as buckets and which includes an immersion heater controlled by a temperature responsive element actuated both in response to the water temperature and to the heating coil temperature.

It is another more particular object of this invention to provide a water heater particularly suitable for maintaining water in a feed bucket at a temperature above freezing, the heater including a conduit attached to a bracket which is easily attachable to a bucket wall, the bracket being movable along the conduit, the conduit terminating in a heater unit including a heating coil projecting from a housing with a temperature sensing member received around the heating coil and projecting into the housing where it is positioned to activate a thermostat, the member sensing both the temperature of the coil and of the surrounding atmosphere.

It is a general object of this invention to provide an immersion type water heater which is thermostatically controlled, the thermostat being activated by sensing the temperature of a temperature sensing member which is received around the heating coil and heated thereby and which projects into the atmosphere being heated by the coil whereby the temperature sensing element is cooled when in water, thereby maintaining the temperature of the temperature sensing element within a range to actuate the heater coil in the presence of desired conditions, the temperature sensing member not being sufficiently cooled in the absence of water whereby the member will activate a thermostat to turn off the heating coil.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a perspective view partially in section of an immersion heater according to this invention positioned in a water bucket.

FIG. 2 is a cross-sectional view of the embodiment of FIG. 1.

FIG. 3 is a cross-sectional view taken along the lines III—III of FIG. 2.

FIG. 4 is a simplified electrical schematic of the heater of this invention.

DESCRIPTION OF THE PREFERRED EMBODIMENTS

FIG. 1 shows a heater device 10 according to this invention therein received in a bucket 11. The heater device consists of a conduit 12, a mounting device 13, a housing member 14, an immersion type heater coil 15 and a guard 16.

The conduit 12 consists of a substantially straight section 18 which terminates in an end portion 19 attached to the housing 14. The straight portion is joined through a bent section 20 to a second end 21 into which an electric cord 22 extends. The bracket device 13 consists of a conduit attaching plate 23 having "U" bolts 24 adjustably attached thereto and engaging the straight section 18 of the conduit. The section 23 of the device 13 terminates in an out-turned lip 26 to which are attached bracket members 27. The attachment of the bracket members is by means of a pivotable connection such as a loose rivet 28. The bracket members include a first leg 29 attached to the lip 26 and a depending second leg 30 spaced from the section 23. Set screws such as adjustable winged screws 32 extend through the legs 30. The mounting device 13 can then be attached fixedly to the bucket 11 by slipping it over the top rim such that the rim is positioned between the legs 30 of the brackets 27 and the plate 23 of the mounting device 13. Tightening the set screws 32 will cause the plate 23 to be brought into engagement with the side of the pail. By means of the pivoting mount of the set screws, it is assured that the device can be attached firmly irrespective of the curvature of the bucket or pail 11.

The attachment of the conduit section 18 through the "U" bolts 24 is adjustable so as to allow the positioning of the mounting device 13 to be adjustable along the length of the straight section 18. This allows the housing 14 and heating loop 15 to lie on the bottom 40 of the pail 11. The conduit 12 is preferably formed of bendable material, particularly at its end section 19 so as to allow the combination of the housing 14 and heating loop 15 and shield 16 to lie flat against the bottom 40.

As best illustrated in FIGS. 2 and 3, the submerged heating assembly consists of a housing member 14 which may be constructed of plastic having a rimmed bore opening 50 thereto through which the conduit end 19 extends. The conduit end 19 is flared as at 51 mating with the taper 52 of the rimmed housing opening 50. A looped immersion heater 15 has two legs 53 and 54 interconnect through a bight section 55. The free ends 56 and 57 of the heater loop project through an end 58 of the housing 14. The immersion heater loop 15 can consist of any of a number of commercially available immersion heaters particularly of the type which comprise a metal tube having a resistance heating coil therein. In the embodiment illustrated, the heating coil consists of a simple U-shaped loop, however it is to be understood that other constructions can be provided, including spiral loops and the like.

A shield member 16 is attached to the loop 15 exterior of the housing to protect the loop and to prevent the loop from contacting a surface of the pail and to further protect against contact from the tongue or nose of an animal. The shield, as illustrated, consists of top 60 and bottom 70 protective sheets, which may be stamped metal. The sheets are attached to the loop through the intermediary of spool-like posts 71. In the preferred embodiment, the posts are constructed of insulation material, preferably ceramics. The posts have an outer diameter greater than the distance between the legs of the loop with a central groove 73 having an inner diameter less than the distance between the legs whereby the insulator posts can be slipped between the legs of the loop. A fastening means such as nuts and bolts 75 serves to attach the shields 60 and 70 to the insulator posts 71. Since the insulator posts will then be entrapped within the loop, the shield will be held in association with the loop.

A temperature sensing band member 80 has a leg thereof 81 in engagement with the legs of the loop 15. The leg 81 preferably has openings 82 through which both legs project in relatively close engagement therewith. The member 80 has a central portion 83 extending therefrom back towards the housing 14. The central portion 83 has a second leg 84 attached thereto which extends into the housing through an opening 85.

The temperature sensing band is preferably positioned such that it will not be loose on the assembly. It is kept in such position due to the positioning of the opening 85 in the housing.

The temperature sensing member 80 will, due to its engagement with the loop 15 sense the temperature of the loop. Normally an increase in the temperature of the loop would increase the temperature of the temperature sensing member 80, which is preferably formed of a good heat conducting material such as copper, and this rise in temperature in the temperature sensing member 80 would be transmitted along its length to its leg 84 within the interior of the housing. Thus the temperature sensing member 80 described above is an effective sensor of temperature of the loop. However, when the device is immersed in water as illustrated in FIG. 1, the water will effectively cool the member 80. Therefore, the leg 84 will substantially register the temperature of the water. In those instances, where the heating loop 15 is not activated, the temperature sensing member 80 will effectively reflect the temperature of both the surrounding atmosphere and the loop.

Should the water level in the container drop below the temperature sensing member 80, that member will be substantially reflecting the temperature of the loop in as much as the band will not be as efficiently cooled by the surrounding air as it was by the water.

Interior of the housing are positioned a thermostat 90 and a thermofuse 91. The end 93 of the leg 84 is preferably wrapped around the thermofuse 91 by forming it into a loop as illustrated at 94. The thermostat 90 is attached to the leg 84 by means such as adhesives etc. As illustrated in the schematic of FIG. 4, a three wired grounded system is preferably used with a hot lead 100, a neutral lead 101 and a ground 102. The hot lead is connected to a hot side 104 of the resistance heater 105 through the thermofuse 91 and the thermostat 90. Microfuses 110 of standard type are provided in both the hot 100 and neutral 101 lines. Preferably the fuses 110, thermofuse 91 and thermostat 90 are all positioned interior of the housing 13 where they may be embedded in a potting compound 112 or other sealant which also locks the ends 56 and 57 of the immersion heater loop in the housing. The conduit 12 serves as infeed for the wiring to the housing and protects the electric cord against chewing by animals watering from the bucket.

In the preferred embodiment, the thermostat 90 will be of a type which will activate the immersion coil when the temperature sensed in the leg 84 is approximately 45° F. By providing a thermostat with an approximately 15° difference between closed and open temperature, the water temperature will be preferably kept warmed above 45°.

If, however, the bucket has been overturned or the heating unit is operated out of water, the heat sensing member 80 then conducts heat from the loop 15 to the thermostat without the benefit of cooling in water. Therefore the thermostat will open. Tests have shown that this can be accomplished in approximately 60 seconds, well before any damage can occur to either the container 11 or to adjacent combustible items. Further tests have shown that the unit is safe even in plastic containers which have been allowed to become dry.

If, for some reason, the thermostat fails in the close position, the thermofuse 91 will then sense the heat buildup in the leg 84 and it will open preventing further heating of the loop. The thermofuse can be adapted to operate at a temperature above the open point of the thermostat but below a combustion temperature. Should the unit become shorted or in any other way fail, the microfuses 110 provide a fail-safe.

It can therefore be seen from the above that my invention provides a novel water heater, particularly suitable for use in small containers such as buckets and the like. The water heater consists of an immersion loop which is electrically connected to a power source through a thermostat, a thermosfuse, and resistance fuses. The fuses and heating loop ends are embedded in a housing to which is attached a protective conduit through which the electric cord to the housing passes. The conduit also has a mounting device adjustably attached thereto. The device is movable along a portion of the length of the conduit to allow variance in spacing between the mounting device and the housing and heating loop. The mounting device includes pivotably attached fastening means which can entrap a pail side wall between a main portion of the mounting device inside of a container and the fastening means outside of the container.

Temperature is sensed by the thermostat and thermofuse through the use of a unique sensing member which has one end embedded in the housing in heat conducting contact with the thermostat and thermofuse and another end exterior of the housing in contact with the heating loop. A central portion spans the distance between the two ends and is located exterior of the housing in an area to be immersed in the surrounding atmosphere. Preferably, the temperature sensing member consists of a bar of good heat conducting material such as metal and preferably copper. The heating loop has a guard attached thereto in a heat insulating manner, the guard projecting beyond the heating loop to protect both the loop and the anatomy of an animal drinking from the container.

Although the teachings of my invention have herein been discussed with reference to specific theories and embodiments, it is to be understood that these are by way of illustration only and that others may wish to utilize my invention in different designs or applications.

I claim as my invention:

1. A water heater device comprising an elongated hollow conduit having an end journaled in a housing member, an immersion heating loop having ends journaled in said housing member with a looped portion projecting exteriorly of said housing member, electrical circuitry in said housing member operatively connected to said immersion heater loop and to electrical wiring entering said housing member through said conduit, said circuitry including a thermostat and a thermofuse each effective to break a circuit to said immersion loop in response to sensing of increased temperatures, a temperature conductive sensing member having a first end portion in said housing, an intermediate portion exterior of said housing and a second end portion in engagement with said immersion heating loop exterior of said housing, said thermostat and said thermofuse sensing temperatures being in heat exchange relation to said first end portion of said temperature sensing member interior of said housing, the thermostat and thermofuse being in thermally isolated relation to the loop ends, an attachment device adjustably mounted on said conduit positionable selectively along the length of said conduit, said attachment device including attachment means selectively actuatable to attach said attachment device to a top of a wall of a container with the housing and heating loop immersed in said container adjacent a bottom thereof, a guard member attached to said looped portion exterior of the said housing, the guard member including a shield having a first portion positioned above said looped portion and a second portion positioned below said looped portion, the looped portion having a bight section spaced from the housing and two substantially parallel leg portions extending from said housing to said bight section, said leg members spaced apart from one another, spool-shaped insulators received between said legs having top and bottom ends with an outer diameter greater than the distance between the legs and a central section having an outer diameter less than the distance between said legs, said shields attached to said insulators, the sensing member second end portion being in contact with both leg members.

* * * * *